(12) United States Patent
You et al.

(10) Patent No.: US 12,200,756 B2
(45) Date of Patent: Jan. 14, 2025

(54) RANDOM ACCESS METHOD AND APPARATUS, NETWORK DEVICE, TERMINAL, AND STORAGE MEDIUM

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 386 days.

(21) Appl. No.: 17/825,999

(22) Filed: May 26, 2022

(65) Prior Publication Data
US 2022/0287082 A1    Sep. 8, 2022

Related U.S. Application Data

(63) Continuation of application No. PCT/CN2019/121900, filed on Nov. 29, 2019.

(51) Int. Cl.
*H04W 74/08* (2024.01)
*H04W 56/00* (2009.01)

(52) U.S. Cl.
CPC ......... *H04W 74/08* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2013/0028198 A1 | 1/2013 | Yamada | |
| 2015/0085839 A1* | 3/2015 | Bergstrom | H04W 56/0045 370/336 |
| 2020/0128582 A1* | 4/2020 | Chen | H04W 72/51 |
| 2020/0314787 A1* | 10/2020 | Liu | H04W 56/00 |
| 2021/0029658 A1* | 1/2021 | Mahalingam | H04W 74/0833 |
| 2022/0022152 A1* | 1/2022 | Liu | H04W 56/0015 |

FOREIGN PATENT DOCUMENTS

| | | |
|---|---|---|
| CN | 102740447 A | 10/2012 |
| CN | 103346829 B | 4/2016 |
| CN | 107801240 A | 3/2018 |

(Continued)

OTHER PUBLICATIONS

International Search Report and Written Opinion dated Jul. 28, 2020 in International Application No. PCT/CN2019/121900. English translation attached.

(Continued)

*Primary Examiner* — Benjamin Lamont
(74) *Attorney, Agent, or Firm* — Sheppard, Mullin, Richter & Hampton LLP

(57) ABSTRACT

The present disclosure relates to a random access method and apparatus, a network device, a terminal, and a storage medium. The terminal transmits a random access request to a network device; and receives a random access response, which is returned by the network device based on the random access request. The random access response is used to indicate a value of an uplink Timing Advance (TA) adjustment amount, and the TA adjustment amount is a positive value, a negative value, or 0.

6 Claims, 3 Drawing Sheets

(56) References Cited

FOREIGN PATENT DOCUMENTS

| | | |
|---|---|---|
| CN | 109788543 A | 5/2019 |
| CN | 110062455 A | 7/2019 |
| CN | 108633106 B | 9/2019 |
| CN | 110446254 A | 11/2019 |
| WO | 2019109270 A1 | 6/2019 |
| WO | 2020200068 A1 | 10/2020 |

OTHER PUBLICATIONS

Ericsson. "3GPP TSG-RAN WG2 #107bis" Tdoc R2-1913783 Remaining aspects on Random access for NTN, Oct. 14, 2019 (Oct. 14, 2019), section 2.1.

CMCC. "3GPP TSG RAN WG1 #99" R1-1912536 Considerations on Timing Advance and RACH for Non-Terrestrial, Nov. 9, 2019 (Nov. 9, 2019), Section 2.

Extended European Search Report dated Oct. 31, 2022 received in European Patent Application No. EP19954368.7.

Ericsson: "Remaining details on Random access for NTN" ,3GPP Draft; R2-1915567,3rd Generation Partnership Project (3GPP) , Mobile Competence Centre ; 650 , Route Des Lucioles ; F-06921 Sophia-Antipolis Cedex; France vol. RAN WG2 , No. Reno , Nevada, US; Nov. 18, 2019-Nov. 22, 2019 Nov. 2019 (Nov. 7, 2019) , XP051815978.

* cited by examiner

RANDOM ACCESS METHOD AND APPARATUS, NETWORK DEVICE, TERMINAL, AND STORAGE MEDIUM

CROSS-REFERENCE TO RELATED APPLICATIONS

The present application is a continuation of International Application No. PCT/CN2019/121900 filed on Nov. 29, 2019, which is hereby incorporated by reference in its entirety.

FIELD

The present disclosure relates to the field of satellite communication, and more particularly, to a random access method and apparatus, a network device, a terminal, and a storage medium.

BACKGROUND

Non Terrestrial Network (NTN) generally provides communication services to terrestrial users by means of satellite communication. Compared with terrestrial cellular network communication, satellite communication has many unique advantages. Firstly, satellite communication is less restricted by geographic regions of users, and can achieve signal coverage in regions such as oceans, mountains, and deserts where a communication device cannot be set up; secondly, satellite communication has a long communication distance, and the cost of network deployment of satellite communication does not increase with the communication distance; and finally, satellite communication has high stability and is less affected by natural disasters. An NTN network is based on communication technologies such as Long Term Evolution (LTE) or New Radio (NR), and adopts an orthogonal multiple access method. In a random access process, an NTN network device can control, by setting an uplink Timing Advance (TA), a time when an uplink signal from a respective terminal (User Equipment, UE for short) arrives at a base station.

Currently, the NTN network can support two types of UEs: UEs having no positioning capability, and UEs having a positioning capability. A UE having the positioning capability can obtain a TA estimation value based on the positioning capability, and use the TA estimation value as an initial TA to transmit a first message MSG1 to a network device. After receiving the MSG1, the network device determines a TA adjustment value of the UE, and transmits the TA adjustment value to the UE through a Timing Advance Command (TAC) in a Random Access Response (RAR). The UE can accumulate the TA estimation value and the TA adjustment value to obtain a target TA.

SUMMARY

Embodiments of the present disclosure provide a random access method and apparatus, a network device, a terminal, and a storage medium, capable of meeting requirements of random access scenarios in an NTN network.

In a first aspect, a random access method is provided. The method includes: transmitting a random access request to a network device; and receiving a random access response, which is returned by the network device based on the random access request. The random access response is used to indicate a value of an uplink TA adjustment amount, and the TA adjustment amount is a positive value, a negative value, or 0.

In a second aspect, a random access method is provided. The method includes: receiving a random access request transmitted by a terminal; and transmitting a random access response to the terminal based on the random access request. The random access response is used to indicate a value of an uplink TA adjustment amount, and the TA adjustment amount is a positive value, a negative value, or 0.

In a third aspect, a terminal is provided. The terminal includes: a memory having a computer program stored thereon; and a processor. The processor is configured to, when executing the computer program, implement steps of: transmitting a random access request to a network device; and receiving a random access response, which is returned by the network device based on the random access request. The random access response is used to indicate a value of an uplink TA adjustment amount, and the TA adjustment amount is a positive value, a negative value, or 0.

BRIEF DESCRIPTION OF DRAWINGS

In order to clearly explain technical solutions of the embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without creative effort.

DESCRIPTION OF EMBODIMENTS

In order to make the objects, technical solutions, and advantages of the present disclosure more apparent, the present disclosure will be described in detail below with reference to the accompanying drawings and embodiments. It should be understood that the specific embodiments described herein are only used to explain, rather than limit, the present disclosure.

Currently, 3rd Generation Partnership Project (3GPP) is studying an NTN technology that generally provides communication services to terrestrial users by means of satellite communication. Compared with terrestrial cellular network communication, satellite communication has many unique advantages. Firstly, satellite communication is not limited by geographical regions of users. For example, typical terrestrial communication cannot cover regions such as oceans, mountains, and deserts where a communication device cannot be set up or where communication coverage is not provided due to sparse population. However, for satellite communication, since a satellite can cover an extensive area of ground and orbit the earth, theoretically every corner of the earth can be covered by satellite communication. Secondly, satellite communication has a great social value. Satellite communication can cover remote mountainous regions and poor and backward countries or regions at low costs, such that people in these regions can have access to advanced voice communication and mobile Internet technologies, which is conducive to narrowing the digital divide between these regions and developed regions and promoting development in these regions. Thirdly, satellite communication has a long communication distance, and the cost of communication does not increase significantly when the communication distance increases. Finally, satellite communication has high stability and is not limited by natural disasters.

In general, communication satellites are classified, based on orbital altitudes, into Low-Earth Orbit (LEO) satellites, Medium-Earth Orbit (MEO) satellites, Geostationary Earth Orbit (GEO) satellites, High Elliptical Orbit (HEO) satellites, etc.

Figure 1:
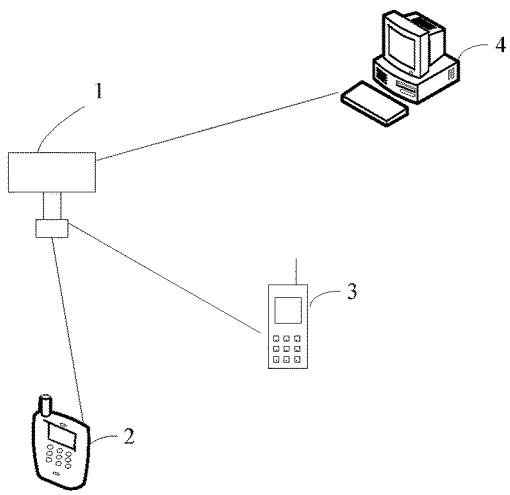
FIG. 1 is a schematic diagram of an application environment of a random access method according to an embodiment.

A random access method according to the embodiments of the present disclosure can be applied to the NTN technology. FIG. 1 is a schematic diagram showing an application scenario of a random access method according to an embodiment of the present disclosure. As illustrated in FIG. 1, the scenario includes a network device 1, UE2, UE3, and UE4, in which the network device 1 communicates with UE2, UE3, and UE4 through a network. Here, the network device 1 can be, but is not limited to, an LEO satellite, an MEO satellite, a GEO satellite, an HEO satellite, etc., and the UEs can be, but are not limited to, various personal computers, notebook computers, smart phones, tablet computers, and portable wearable devices. It should be noted that the present disclosure may also include a larger number of base stations and UEs, and is not limited to FIG. 1.

In the scenario illustrated in FIG. 1, an NTN network can support two types of UEs: UEs having no positioning capability, and UEs having a positioning capability. For a UE having no positioning capability, a network device broadcasts a public TA to the UE based on a transmission path, and after receiving a random access request transmitted by the UE, indicates a dedicated TA to the UE in an RAR. The UE, after receiving the dedicated TA, can accumulate the public TA and the dedicated TA to obtain a target TA of the UE. For a UE having the positioning capability, the UE may obtain a TA estimation value based on the positioning capability, and use the TA estimation value as an initial TA to transmit a first message MSG1 to the network device. After receiving the MSG1, the network device determines a TA adjustment amount of the UE, and transmits the TA adjustment amount to the UE through a TAC in the RAR; and the UE can accumulate the TA estimation value and the TA adjustment amount to obtain the target TA.

Compared with a random access process in the conventional NR technology, the UE having the positioning capability transmits the random access request to the network device through the TA estimation value. Accuracy of the TA estimation value obtained by the UE is directly related to the positioning capability of the UE. Since the TA estimation value may be greater or smaller than the actual initial TA of the UE, when the network device determines the TA adjustment amount of the UE based on a reception time point of the MSG1, the TA adjustment amount may be a value greater than, equal to, or smaller than zero.

However, at present, a TAC field in an RAR payload specified in existing NR protocols can only be used to indicate a TA adjustment amount greater than or equal to 0, which does not meet requirements of random access scenarios of a terminal having a positioning capability in the NTN network.

In view of the above problems, for a random access process in an NTN system, the RAR needs to be able to indicate the TA adjustment amount having an attribute as a positive value, a negative value, and 0. Therefore, the random access method according to the embodiments of the present disclosure can solve the problem of how to indicate the TA adjustment amount in the random access process.

It should be noted that the random access method of the present disclosure is not limited to solving the above technical problems, and can also be used to solve other technical problems, and the present disclosure is not limited in this regard.

The technical solutions of the present disclosure will be described in detail below with specific embodiments. The following specific embodiments may be combined with each other, and thus the same or similar concepts or processes may not be repeated in some embodiments.

Figure 2:
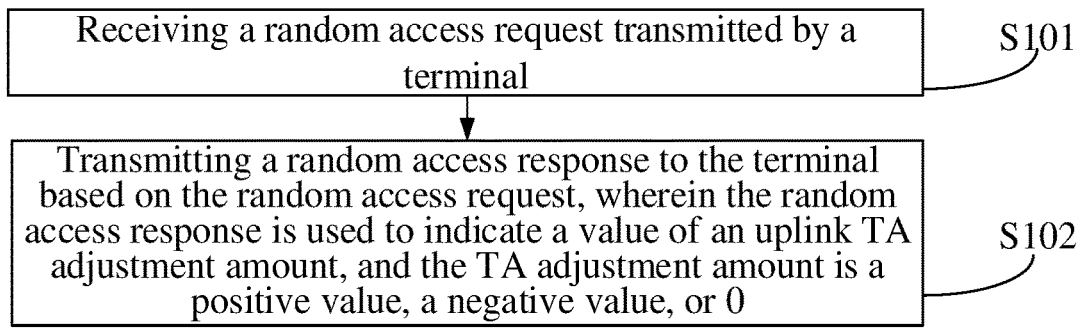
FIG. 2 is a flowchart of a random access method according to an embodiment.

FIG. 2 is a flowchart of a random access method according to an embodiment. Description of the random access method in this embodiment is made by taking the random access method running in the network device illustrated in FIG. 1 as an example. As illustrated in FIG. 2, the random access method includes the following steps.

At S101, a random access request transmitted by a terminal is received.

Here, the random access request may be a random access preamble transmitted by the terminal to the network device when a random access process is triggered. The preamble is mainly used for indicating to the network device that the random access request exists, and enabling the network device to estimate, based on the preamble, a transmission delay between the network device and a UE to obtain a TA adjustment amount of the UE.

The random access process may be triggered when the terminal, i.e., the UE, initially accesses the network device, or may be triggered when the UE re-establishes a wireless connection after a wireless link between the UE and the network device fails. The transmitting scenario of the random access request is not limited here.

When transmitting the preamble to the network device, the UE needs to obtain the preamble and a Physical Random Access Channel (PRACH) resource that can be used for transmitting the preamble. The random access process can be a non-contention-based random access method, and the network device can specify to the UE a preamble and a PRACH resource that are used for random access. In addition, the random access process can also be a contention-based random access method. The network device broadcasts preambles and PRACH resources available for the random access. The UE selects one preamble, and then, selects one PRACH resource from the available PRACH resources to transmit the preamble to the network device.

In the NTN network, after obtaining the PRACH resource, the UE can obtain a distance between the UE and the network device based on the positioning capability, and estimate a TA estimation value based on the distance.

Further, the UE may transmit, based on the TA estimation value, the random access request in advance in timing.

Based on the above steps, the network device may receive the random access request through the PRACH resource.

At S102, a random access response is transmitted to the terminal based on the random access request. The random access response is used to indicate a value of an uplink TA adjustment amount, and the TA adjustment amount is a positive value, a negative value, or 0.

After receiving the random access request transmitted by the UE, the network device can obtain the TA adjustment amount of the UE based on a reception time point of the random access request and a time point when the UE transmits the random access request (i.e., time corresponding to a PRACH time domain resource used by the UE).

Specifically, the network device may determine the TA adjustment amount of the UE based on the reception time point of the random access request. The manner of determining the TA adjustment amount is not limited herein.

Figure 2A:
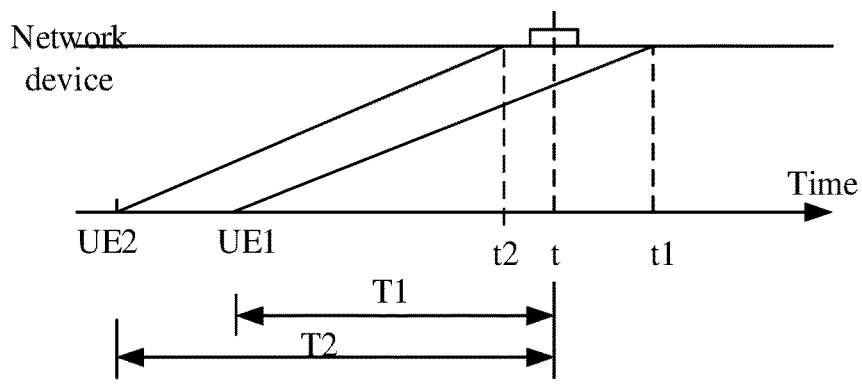
FIG. 2A is a schematic diagram of a random access method according to an embodiment.

As illustrated in FIG. 2A, the network device indicates, through the PRACH resource, each UE to receive the random access request near a reception time point t. UE1 transmits a random access request 1 based on an estimated TA estimation value T1, and the network device receives the random access request 1 at the time point t1. In this case, the network device can determine that a TA adjustment amount of the UE is a positive value t1−t. That is, the network device needs the UE1 to transmit, based on the T1, a signal in advance to adjust the TA of the UE to T1+t1−t.

For UE2, UE2 transmits a random access request 2 based on an estimated TA estimation value T2, and the network device receives the random access request 2 at a time point t2. In this case, the network device can determine that a TA adjustment amount of the UE2 is a negative value t2−t. That is, the network device needs the UE2 to delay, based on the T2, transmitting a signal to adjust the TA of the UE2 to T2+t2−t.

The TA adjustment amount of the UE obtained by the network device may be a positive value, a negative value, or 0. The network device can convert the TA adjustment amount into a value of a corresponding bit field in the RAR and indicate the terminal to adjust the TA through the RAR.

Specifically, the value of the corresponding bit field in the RAR may indicate an absolute value of the TA adjustment amount and a positive or negative attribute of the TA adjustment amount; and the UE obtains the TA adjustment amount based on the absolute value and the positive or negative attribute. Alternatively, the value of the corresponding bit field in the RAR can also directly indicate a value of the TA adjustment amount. For example, some values represented by the bit field indicate TA adjustment amounts having the positive attribute, and other values represented by the bit field indicate TA adjustment amounts having the negative attribute. The indication manner of the TA adjustment amount is not limited here.

Further, the network device may transmit the RAR to the terminal.

In the above random access method, the network device receives the random access request transmitted by the terminal; and then transmits the random access response to the terminal based on the random access request. The random access response is used to indicate the value of the uplink timing TA adjustment amount, and the TA adjustment amount is a positive value, a negative value, or 0. Since the TA adjustment amount indicated by the random access response transmitted by the network device can be a positive value, a negative value, or 0, when the TA estimation value obtained by the terminal is greater or smaller than an actual initial TA of the terminal, the terminal can adjust, based on the TA adjustment amount indicated by the random access response, the TA estimation value correspondingly, so as to successfully access the network device based on the adjusted TA.

Figure 3:
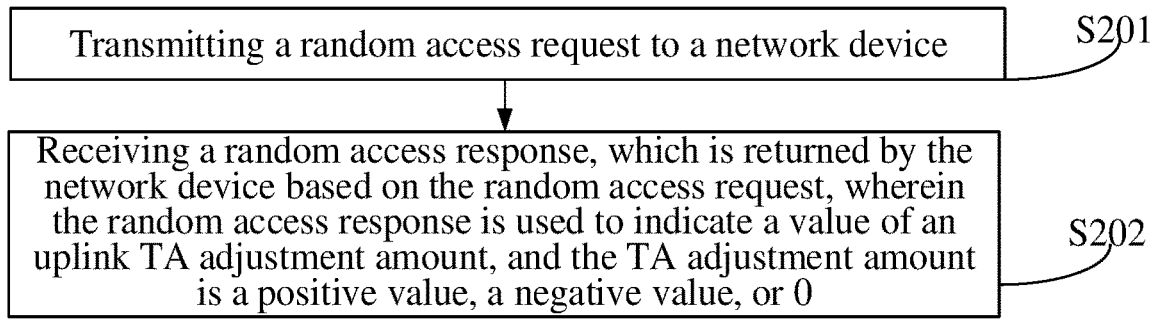
FIG. 3 is a flowchart of a random access method according to another embodiment.

FIG. 3 is a flowchart of a random access method according to an embodiment. Description of the random access method in this embodiment is described by taking the random access method running in the terminal illustrated in FIG. 1 as an example. As illustrated in FIG. 3, the random access method includes the following steps.

At S201, a random access request is transmitted to a network device.

Specifically, a transmitting method adopted by the UE to transmit the random access request to the network device is similar to that described at S101 in the above embodiment, and details thereof will be omitted here.

At S202, a random access response, which is returned by the network device based on the random access request, is received. The random access response is used to indicate a value of an uplink TA adjustment amount, and the TA adjustment amount is a positive value, a negative value, or 0.

After the UE transmits the random access request to the network device, it can open a random access response time window ra-ResponseWindow, and monitor, within the ra-ResponseWindow, a Physical Downlink Control Channel (PDCCH) scrambled by a Random Access Radio Network Temporary Identifier (RA-RNTI) of the UE. After successfully receiving the PDCCH scrambled by the RA-RNTI, the UE may obtain a Physical Downlink Shared Channel (PDSCH) resource scheduled by the PDCCH and read the RAR from the PDSCH resource.

A corresponding bit field in the RAR carries a value used to indicate the TA adjustment amount. The TA adjustment amount can be a positive value, a negative value, or 0. The UE may convert the value used to indicate the TA adjustment amount into the TA adjustment amount transmitted by the network device.

Specifically, when the UE converts the value used to indicate the TA adjustment amount into the TA adjustment amount, a conversion method adopted by the UE corresponds to the indication manner of the TA adjustment amount adopted by the network device.

Further, the UE can obtain the target TA based on the TA estimation value and the TA adjustment value. The TA estimation value is estimated by the UE based on the positioning capability, and is an initial TA value used when the UE transmits the random access request to the network device. Optionally, the UE may determine a sum of the TA estimation value and the TA adjustment value as the target TA.

With the above random access method, the terminal transmits the random access request to the network device; and receives the random access response, which is returned by the network device based on the random access request. The random access response is used to indicate the value of the uplink TA adjustment amount, and the TA adjustment amount is a positive value, a negative value, or 0. Since the TA adjustment amount indicated by the random access response received by the terminal can be a positive value, a negative value or 0, when the TA estimation value obtained by the terminal is greater or smaller than an actual initial TA of the terminal, the terminal can adjust, based on the TA adjustment amount indicated by the random access response, the TA estimation value correspondingly, so as to successfully access the network device based on the adjusted TA.

The following embodiments relate to the indication manner of the TA adjustment amount in the RAR in the random access method, and the indication manner can be applied to the network device and the terminal illustrated in FIG. 1.

In an embodiment, on a basis of the above embodiments, the random access response includes a TA attribute indication field and an uplink TAC field. The TA attribute indication field is used to indicate a positive or negative attribute of the TA adjustment amount, and the TAC field has an indication field of a predetermined length for indicating an absolute value of the TA adjustment amount.

When the TA attribute indication field indicates the positive or negative attribute, a value of the TA attribute indication field, when being 1, can indicate that the TA adjustment amount is a non-negative value, and the value of the TA attribute indication field, when being 0, can indicate that the TA adjustment amount is a negative value. Alternatively, the value of the TA attribute indication field, when being 0, can indicate that the TA adjustment amount is a non-negative value, and the value of the TA attribute indication field, when being 1, can indicate that the TA adjustment amount is a negative value. Other methods can also be used to indicate the TA attribute, and the embodiments of the present disclosure are not limited in this regard.

Here, the TA attribute indication field may be located within or outside the above TAC field, and the present disclosure is not limited in this regard.

When located outside the TAC field, the TA attribute indication field is an independent field in the RAR, either before the TAC field or after the TAC field. The TA attribute indication field may be adjacent to the TAC field, or may be separated from the TAC field by a predetermined number of bits, and the present disclosure is not limited in this regard.

When the TA attribute indication field is located outside the TAC field, the TAC field may indicate an absolute value of the TA adjustment amount through a part of the TAC field. Optionally, the predetermined length is equal to a length of the TAC field. That is, the TAC field can indicate the absolute value of the TA adjustment amount through all the bit field. For example, when a length of the TAC field is 8, the predetermined length may also be 8.

When the TA attribute indication field is located within the TAC field, the TA attribute indication field may be located at a beginning or an end of the TAC field, or may be located at other positions in the TAC field, and the present disclosure is not limited in this regard.

When the TA attribute indication field is located within the TAC field, the indication field of the predetermined length in the TAC field may be a part of the remaining bits in the TAC field other than the TA attribute indication field. Optionally, the TA attribute indication field is a 1-bit field, and the predetermined length is equal to a length of the TAC field minus 1. For example, when the length of the TAC field is 8, the predetermined length may be 7.

When the network device indicates the absolute value of the TA adjustment amount through the indication field of the predetermined length in the TAC field, different indication manners may be used.

Optionally, the indication field of the predetermined length may be used to indicate a first index value of the TA adjustment amount. The first index value is used for indicating a terminal to obtain, based on the first index value and a predetermined TA adjustment amount algorithm, the absolute value of the TA adjustment amount.

For example, when the predetermined length is N1, values 0 to $2^{N1}-1$ of the indication field of the length N1 may indicate $2^{N1}$ first index values in a one-to-one correspondence. Here, the first index value $2^{N1}-1$ may be used to indicate a maximum absolute value or a minimum absolute value. After obtaining the first index value, the UE may substitute the first index value into a predetermined TA adjustment amount algorithm to calculate the absolute value of the TA adjustment amount corresponding to the first index value. The TA adjustment amount algorithm may be one formula, or may include different formulas. For example, one of the different formulas may be selected based on a scenario in which the UE triggers a random access.

Optionally, the indication field of the predetermined length can be used to indicate a first mapping value of the TA adjustment amount; the first mapping value is used for indicating a terminal to obtain, based on the first mapping value and a predetermined first mapping table, the absolute value of the TA adjustment amount; and the predetermined first mapping table includes a correspondence between the first mapping value and the absolute value of the TA adjustment amount.

For example, the first mapping table may be set in both the UE and the network device. When the predetermined length is N1, the first mapping table may include a correspondence between $2^{N1}$ absolute values of TA adjustment amounts and $2^{N1}$ first mapping values. The network device may select, based on the absolute value of the TA adjustment amount, a first mapping value corresponding to the absolute value from the first mapping table and determine the first mapping value as a value of the indication field in the TAC. After receiving the RAR, the UE may search, based on the value of the indication field in the TAC, the first mapping table for an absolute value of the TA adjustment amount corresponding to the first mapping value.

Figure 4:
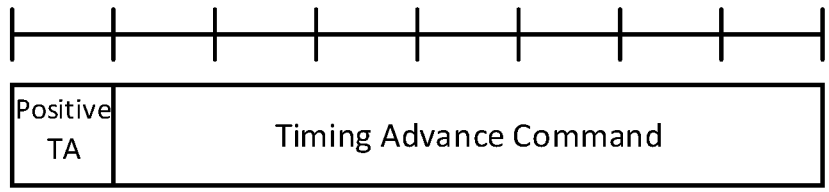
FIG. 4 is a schematic diagram of a TAC field according to an embodiment.

The random access method will be described with specific embodiments. As illustrated in FIG. 4, the length of the TAC field is 7, and the TA attribute indication field, Positive TA, is located outside the TAC field. The TA attribute indication field, when being 1, indicates that the TA adjustment amount is a non-negative value, and the TA attribute indication field, when being 0, indicates that the TA adjustment amount is a negative value. The length of the TAC field is equal to the predetermined length, which may correspond to 128 first index values.

The value of the TAC field obtained by the UE, when being 1000000, indicates that the first index value is 64, and then the absolute value of the TA adjustment amount is obtained based on the TA adjustment amount algorithm f(index). Further, on a basis of the obtained value of the TA attribute indication field being 0, the UE can know that the TA adjustment amount indicated in the RAR is −f(index).

In the random access method, the network device indicates the absolute value of the TA adjustment amount and the positive or negative attribute of the TA adjustment amount in the RAR, such that the terminal can obtain the TA adjustment amount based on the absolute value of the TA adjustment amount and the positive or negative attribute of the TA adjustment amount. Since the TA adjustment amount can be a positive value, a negative value, or 0, the terminal can adjust the TA correspondingly based on the TA adjustment amount to adapt to application scenarios in the NTN network.

In an embodiment, on a basis of the above embodiments, the random access response includes a TAC field used to indicate the value of the TA adjustment amount.

Specifically, the value of the TAC field in the RAR can be directly mapped to the value of the TA adjustment amount based on a predetermined rule, and the TA adjustment amounts may range from a minimum TA adjustment amount having a negative attribute to a maximum TA adjustment amount having a positive attribute.

When the network device indicates the value of the TA adjustment amount through the TAC field, different indication manners may be used.

Optionally, the TAC field can be used to indicate a second mapping value of the TA adjustment amount. The second mapping value is used for indicating a terminal to obtain, based on the second mapping value and a predetermined second mapping table, the value of the TA adjustment amount; and the second mapping table includes a correspondence between the second mapping value and the TA adjustment amount.

For example, the second mapping table may be set in both the UE and the network device. When the length of the TAC field is N, the first mapping table may include a correspondence between $2^N$ values of TA adjustment amounts and $2^N$ second mapping values. Here, a part of the second mapping values correspond to TA adjustment amounts each having a negative attribute. The network device may select, based on the value of the TA adjustment amount, a second mapping value corresponding to the value of the TA adjustment amount from the second mapping table and determine the second mapping value as the value of the TAC field. After receiving the RAR, the UE may search, based on the value of the TAC field, the second mapping table for the value of the TA adjustment amount corresponding to the second mapping value.

Optionally, the TAC field may be used to indicate a second index value of the TA adjustment amount; and the second index value is used for indicating a terminal to obtain, based on the second index value and a predetermined TA adjustment amount algorithm, the value of the TA adjustment amount.

For example, when the length of the TAC field is N, values 0 to $2^N-1$ of the TAC field may indicate $2^N$ second index values in a one-to-one correspondence. After obtaining the second index value, the UE may substitute the second index value into the predetermined TA adjustment amount algorithm to calculate the value of the TA adjustment amount corresponding to the second index value. The TA adjustment amount algorithm may map 0 to the maximum TA adjustment amount, or may map $2^N-1$ to the maximum TA adjustment amount, and the TA adjustment amount algorithm is not limited in this regard.

Optionally, a length of the TAC field is N; the second index value, when being any of 0 to $2^{N-1}-2$, is used to indicate a TA adjustment value having a negative attribute; the second index value, when being $2^{N-1}$, is used to indicate a TA adjustment value having an attribute of 0; and the second index value, when being any of $2^N$ to $2^N-1$, is used to indicate a TA adjustment value having a positive attribute.

Figure 5:
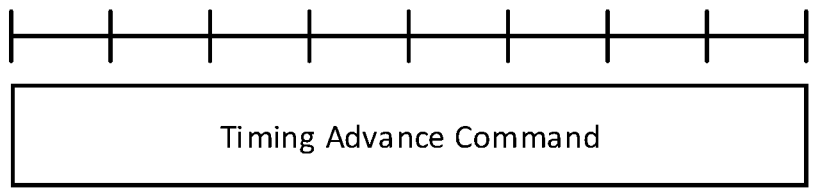
FIG. 5 is a schematic diagram of a TAC field according to another embodiment.

The random access method will be described with specific embodiments. As illustrated in FIG. 5, the length of the TAC field is 8. Values of the TAC field may correspond to 256 second index values. The value of the TAC field obtained by the UE, when being 10000000, indicates that the second index value is 128, and then the value of the TA adjustment amount is obtained based on the TA adjustment amount algorithm f(index). In the TA adjustment amount algorithm, index values 0 to 126 indicate 127 TA adjustment amounts having negative attributes in a one-to-one correspondence; an index value 127 indicates that the TA adjustment amount is 0; and index values 128 to 255 indicate 128 TA adjustment amounts having positive attributes in a one-to-one correspondence.

The indication manner of the TA adjustment amount in the above random access method is different from that in the above embodiment, but their signaling overheads are the same.

In the above random access method, the network device directly indicates the TA adjustment amount through the TAC field in the RAR, such that the terminal can directly obtain, based on the value of the TAC field, the TA adjustment amount including the positive or negative attribute. Further, the TA can be adjusted correspondingly to adapt to application scenarios in the NTN network.

It should be understood that although steps in each of the flowcharts illustrated in FIG. 2 and FIG. 3 are illustrated in a sequence indicated by an arrow, these steps are not necessarily executed in the sequence indicated by the arrow. Unless explicitly stated herein, execution of these steps is not strictly limited to the sequence, and these steps may be performed in other sequences. In addition, at least a part of the steps in each of FIG. 2 and FIG. 3 may include several sub-steps or several stages. These sub-steps or stages are not necessarily executed and completed at the same time, but may be executed at different times. These sub-steps or stages are also not necessarily executed sequentially one by one, but may be executed in turn or alternately with other steps, or sub-steps of other steps, or at least a part of the stages.

Figure 6:
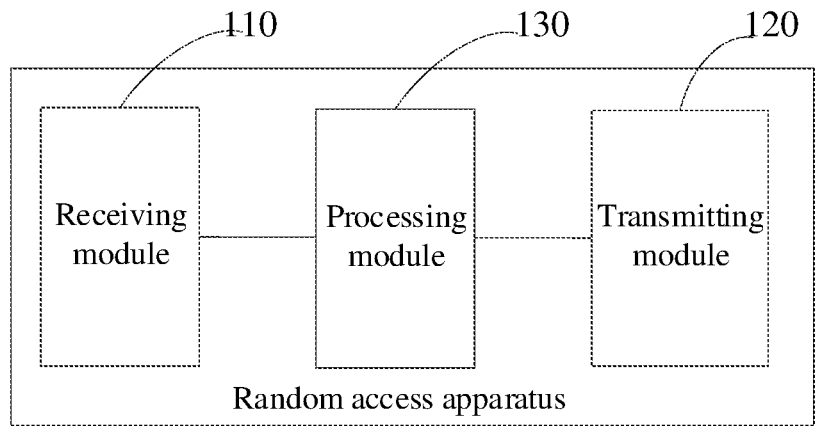
FIG. 6 is a block diagram of a random access apparatus according to an embodiment.

In an embodiment, a random access apparatus is provided. As illustrated in FIG. 6, the random access apparatus includes a receiving module 110, a transmitting module 120, and a processing module 130. The processing module 130 is configured to receive, through the receiving module 110, a random access request transmitted by a terminal. The processing module 130 is further configured to transmit, through the transmitting module 120, a random access response to the terminal based on the random access request. The random access response is used to indicate a value of an uplink TA adjustment amount, and the TA adjustment amount is a positive value, a negative value, or 0.

Implementation principles and technical effects of the random access apparatus according to the above embodiment are similar to those of the method embodiments, and details thereof will be omitted here.

In an embodiment, on a basis of the above embodiment, the random access response includes a TA attribute indication field and an uplink TAC field; the TA attribute indication field is used to indicate a positive or negative attribute of the TA adjustment amount; and the TAC field has an indication field of a predetermined length for indicating an absolute value of the TA adjustment amount.

In an embodiment, on a basis of the above embodiment, the TA attribute indication field is located outside the TAC field.

In an embodiment, on a basis of the foregoing embodiment, the predetermined length is equal to a length of the TAC field.

In an embodiment, on a basis of the above embodiment, the TA attribute indication field is located within the TAC field.

In an embodiment, on a basis of the above embodiment, the predetermined length is equal to a length of the TAC field minus 1.

In an embodiment, on a basis of the above embodiment, the TA attribute indication field is located at a beginning or an end of the TAC field.

In an embodiment, on a basis of the above embodiment, the indication field of the predetermined length is used to indicate a first index value of the TA adjustment amount; and the first index value is used for indicating a terminal to obtain, based on the first index value and a predetermined TA adjustment amount algorithm, the absolute value of TA adjustment amount.

In an embodiment, on a basis of the above embodiment, the indication field of the predetermined length is used to indicate a first mapping value of the TA adjustment amount; the first mapping value is used for indicating a terminal to obtain, based on the first mapping value and a predetermined first mapping table, the absolute value of the TA adjustment amount; and the predetermined first mapping table includes a correspondence between the first mapping value and the absolute value of the TA adjustment amount.

In an embodiment, on a basis of the above embodiment, the random access response includes a TAC field used to indicate the value of the TA adjustment amount.

In an embodiment, on a basis of the above embodiment, the TAC field is used to indicate a second mapping value of the TA adjustment amount; the second mapping value is used for indicating a terminal to obtain, based on the second mapping value and a predetermined second mapping table, the value of the TA adjustment amount; and the second mapping table includes a correspondence between the second mapping value and the TA adjustment amount.

In an embodiment, on a basis of the above embodiment, the TAC field is used to indicate a second index value of the TA adjustment amount; and the second index value is used for indicating a terminal to obtain, based on the second index value and a predetermined TA adjustment amount algorithm, the value of the TA adjustment amount.

In an embodiment, on a basis of the above embodiment, a length of the TAC field is N; the second index value, when being any of 0 to $2^{N-1}-2$, is used to indicate a TA adjustment value having a negative attribute; the second index value, when being $2^{N-1}-1$, is used to indicate a TA adjustment value having an attribute of 0; and the second index value, when being any of $2^N$ to $2^N-1$, is used to indicate a TA adjustment value having a positive attribute.

The implementation principles and technical effects of the random access apparatus according to the above embodiments are similar to those of the method embodiments, and details thereof will be omitted here.

Figure 7:
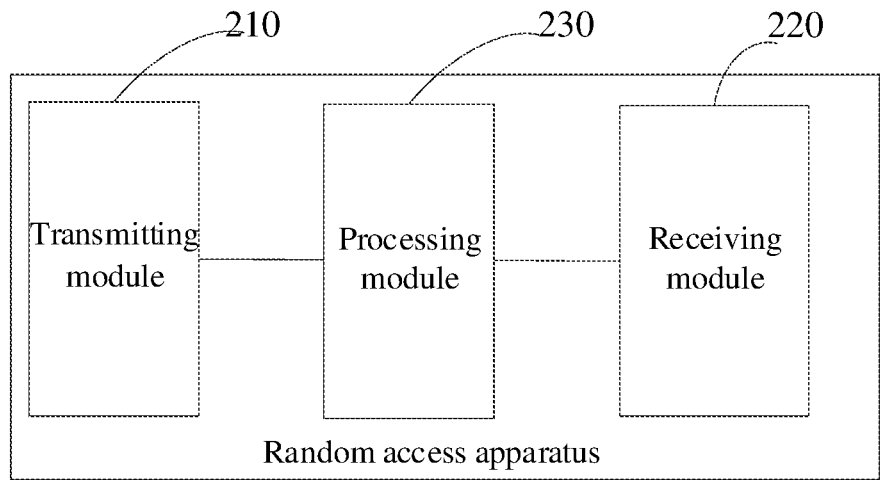
FIG. 7 is a block diagram of a random access apparatus according to another embodiment.

In an embodiment, a random access apparatus is provided. As illustrated in FIG. 7, the random access apparatus includes a transmitting module 210, a receiving module 220, and a processing module 230. The processing module 230 is configured to transmit, through the transmitting module 210, a random access request to a network device. The processing module 230 is further configured to receive, through the receiving module 220, a random access response, which is returned by the network device based on the random access request. The random access response is used to indicate a value of an uplink TA adjustment amount, and the TA adjustment amount is a positive value, a negative value, or 0.

Implementation principles and technical effects of the random access apparatus according to the above embodiment are similar to those of the method embodiments, and details thereof will be omitted here.

In an embodiment, on a basis of the above embodiment, the random access response includes a TA attribute indication field and an uplink TAC field; the TA attribute indication field is used to indicate a positive or negative attribute of the TA adjustment amount; and the TAC field has an indication field of a predetermined length for indicating an absolute value of the TA adjustment amount.

In an embodiment, on a basis of the above embodiment, the TA attribute indication field is located outside the TAC field.

In an embodiment, on a basis of the above embodiment, the predetermined length is equal to a length of the TAC field.

In an embodiment, on a basis of the above embodiment, the TA attribute indication field is located within the TAC field.

In an embodiment, on a basis of the above embodiment, the predetermined length is equal to a length of the TAC field minus 1.

In an embodiment, on a basis of the above embodiment, the TA attribute indication field is located at a beginning or an end of the TAC field.

In an embodiment, on a basis of the above embodiment, the indication field of the predetermined length is used to indicate a first index value of the TA adjustment amount; and the first index value is used for indicating the terminal to obtain, based on the first index value and a predetermined TA adjustment amount algorithm, the absolute value of the TA adjustment amount.

In an embodiment, on a basis of the above embodiment, the indication field of the predetermined length is used to indicate a first mapping value of the TA adjustment amount; the first mapping value is used for indicating the terminal to obtain, based on the first mapping value and a predetermined first mapping table, the absolute value of the TA adjustment amount; and the predetermined first mapping table includes a correspondence between the first mapping value and the absolute value of the TA adjustment amount.

In an embodiment, on a basis of the above embodiment, the random access response includes a TAC field used to indicate the value of the TA adjustment amount and a positive and negative attribute of the TA adjustment amount.

In an embodiment, on a basis of the foregoing embodiment, the TAC field is used to indicate a second mapping value of the TA adjustment amount; the second mapping value is used for indicating the terminal to obtain, based on the second mapping value and a predetermined second mapping table, the value of the TA adjustment amount; and the second mapping table includes a correspondence between the second mapping value and the TA adjustment amount.

In an embodiment, on a basis of the above embodiment, the TAC field is used to indicate a second index value of the TA adjustment amount; and the second index value is used for indicating the terminal to obtain, based on the second index value and a predetermined TA adjustment amount algorithm, the value of the TA adjustment amount.

In an embodiment, on a basis of the above embodiment, a length of the TAC field is N; the second index value, when being any of 0 to $2^{N-1}-2$, is used to indicate a TA adjustment value having a negative attribute; the second index value, when being $2^{N-1}-1$, is used to indicate a TA adjustment value having an attribute of 0; and the second index value, when being any of $2^N$ to $2^N-1$, is used to indicate a TA adjustment value having a positive attribute.

In an embodiment, on a basis of the above embodiment, the random access request is transmitted by a terminal based on a TA estimation value; and the processing module 230 is further configured to: obtain a target TA based on the TA estimation value and the TA adjustment value.

The implementation principles and technical effects of the random access apparatus according to the above embodiments are similar to those of the method embodiments, and details thereof will be omitted here.

The division of the random access apparatus into various modules is for illustration only. In other embodiments, the random access apparatus may be divided into different modules as required to complete all or part of the functions of the random access apparatus.

For specific limitations of the random access apparatus, reference may be made to limitations of the random access method, which will not be repeated here. Each module in the random access apparatus may be implemented in whole or in part by software, hardware and a combination thereof. The above modules can be embedded in or independent of the processor in the computer device in the form of hardware, or stored in the memory in the computer device in the form of software, such that the processor can invoke and execute operations corresponding to the above modules.

Figure 8:
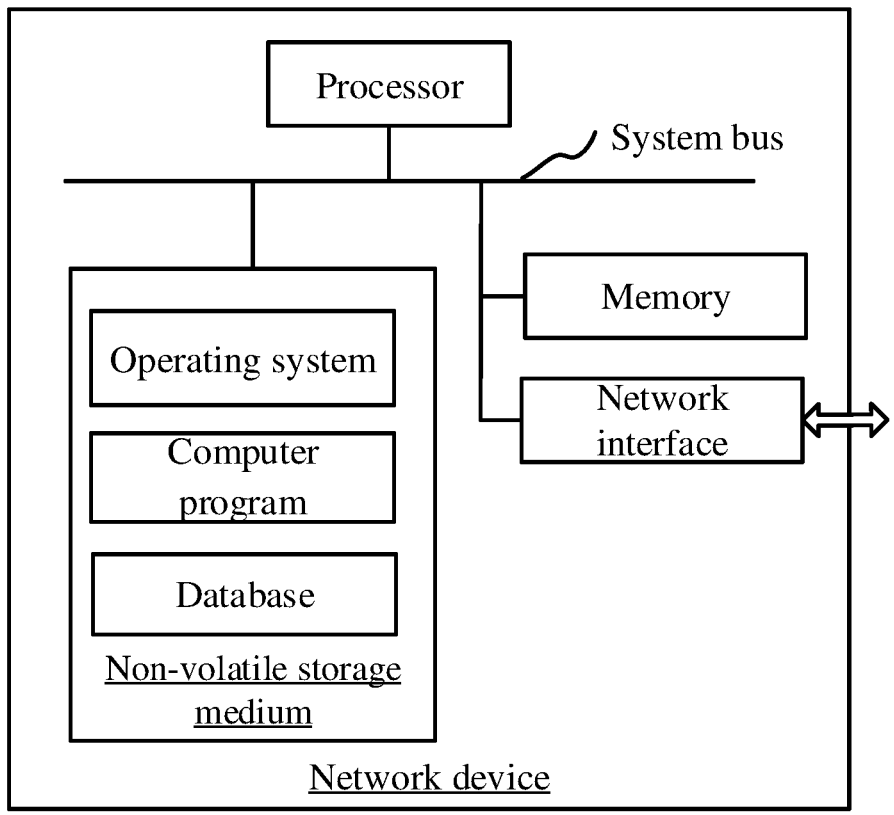
FIG. 8 is a schematic diagram illustrating an internal structure of a network device according to an embodiment.

FIG. 8 is a schematic diagram illustrating an internal structure of a network device according to an embodiment. As illustrated in FIG. 8, the network device includes a processor, a non-volatile storage medium, a memory, and a network interface that are connected via a system bus. Here, the processor is configured to provide computing and control capabilities to support the operation of the entire electronic device. A storage device is configured to store data, programs, etc., and at least one computer program. The computer program can be executed by the processor to implement a wireless network communication method applicable to the network device according to the embodiments of the present disclosure. The storage device may include the non-volatile storage medium and the memory. The non-volatile storage medium stores an operating system and a computer program. The computer program can be executed by the processor to implement the random access method according to any of the following embodiments. The memory provides a cache execution environment for the operating system and the computer program in the non-volatile storage medium. The network interface can be an Ethernet card or a wireless network card, etc., and is configured to communicate with external electronic devices. Those skilled in the art can understand that the structure illustrated in FIG. 8 is only a block diagram of a partial structure related to the solutions of the present disclosure, and does not constitute a limitation on the network device to which the solutions of the present disclosure are applied. A specific network device may include more or fewer components than those illustrated in the figures, or combine certain components, or have a different arrangement of components.

Figure 9:
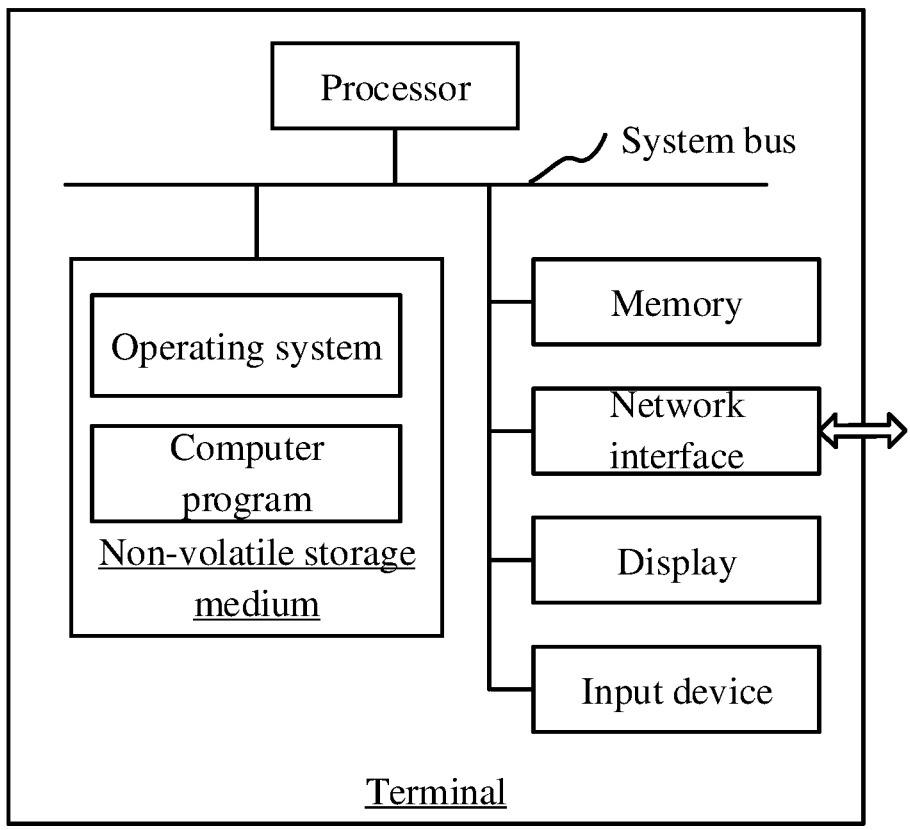
FIG. 9 is a schematic diagram illustrating an internal structure of a terminal according to an embodiment.

In an embodiment, a terminal is provided. An internal structure diagram of the terminal may be as illustrated in FIG. 9. The terminal includes a processor, a storage device, a network interface, a display, and an input device that are connected via a system bus. Here, the processor of the terminal is configured to provide computing and control capabilities. The storage device of the terminal includes a non-volatile storage medium and a memory. The non-volatile storage medium stores an operating system and a computer program. The memory provides an environment for the execution of the operating system and the computer program in the non-volatile storage medium. The network interface of the terminal is configured to communicate with an external terminal through a network connection. The computer program, when executed by the processor, implements the random access method. The display of the terminal may be a liquid crystal display or an electronic ink display. The input device of the terminal may be a touch layer covering the display, or a button, a trackball, or a touch panel arranged on a housing of the terminal, or a keyboard, a touch panel, or a mouse, etc., that is externally connected to the terminal.

Those skilled in the art can understand that the structure illustrated in each of FIG. 8 and FIG. 9 is only a block diagram of a partial structure related to the solutions of the present disclosure, and does not constitute a limitation on the network device or terminal to which the solutions of the present disclosure are applied. A specific network device or terminal may include more or fewer components than those illustrated in the figures, or combine certain components, or have a different arrangement of components.

Each module in the network device apparatus according to the embodiments of the present disclosure may be implemented in the form of a computer program. The computer program can be run on a terminal or a server. A program module constituted by the computer program can be stored in a storage device of the terminal or the server. The computer program, when executed by the processor, implements the steps of the methods described in the embodiments of the present disclosure.

In an embodiment, a network device is provided. The network device includes: a memory having a computer program stored thereon; and a processor. The processor is configured to, when executing the computer program, implement steps of: receiving a random access request transmitted by a terminal; and transmitting a random access response to the terminal based on the random access request. The random access response is used to indicate a value of an uplink TA adjustment amount, and the TA adjustment amount is a positive value, a negative value, or 0.

In an embodiment, a terminal is provided. The terminal includes: a memory having a computer program stored thereon; and a processor. The processor is configured to, when executing the computer program, implement steps of: transmitting a random access request to a network device; and receiving a random access response, which is returned by the network device based on the random access request. The random access response is used to indicate a value of an uplink TA adjustment amount, and the TA adjustment amount is a positive value, a negative value, or 0.

Implementation principles and technical effects of the network device and the terminal according to the above embodiments are similar to those of the above method embodiments, and details thereof will be omitted here.

The embodiments of the present disclosure further provide a computer-readable storage medium, such as one or more non-volatile computer-readable storage media including computer-executable instructions. When executed by one or more processors, the computer-executable instructions cause the one or more processors to perform steps of a random access method. The steps include: receiving a random access request transmitted by a terminal; and transmitting a random access response to the terminal based on the random access request. The random access response is used to indicate a value of an uplink TA adjustment amount, and the TA adjustment amount is a positive value, a negative value, or 0.

Implementation principles and technical effects of the computer-readable storage medium according to the above embodiment are similar to those of the above method embodiments, and details thereof will be omitted here.

The embodiments of the present disclosure further provide a computer-readable storage medium, such as one or more non-volatile computer-readable storage media including computer-executable instructions. When executed by one or more processors, the computer-executable instructions cause the one or more processors to perform steps of a random access method. The steps include: transmitting a random access request to a network device; and receiving a random access response, which is returned by the network device based on the random access request. The random access response is used to indicate a value of an uplink TA adjustment amount, and the TA adjustment amount is a positive value, a negative value, or 0.

Implementation principles and technical effects of the computer-readable storage medium according to the above embodiment are similar to those of the above method embodiments, and details thereof will be omitted here.

A computer program product including instructions, when executed on a computer, causes the computer to perform the random access method.

Any reference to a memory, a storage, a database, or other media as used herein may include a non-volatile and/or a volatile memory. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) that acts as an external cache memory. By way of illustration, rather than limitation, an RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiments illustrate merely some implementations of the present disclosure. Although description of the above embodiments is specific and detailed, the description should not be construed as limitations on the scope of the present disclosure. It should be pointed out that, various modifications and improvements can be made by those skilled in the art without departing from the concept of the present disclosure, and shall fall within the protection scope of the present disclosure as defined by the claims as attached.

What is claimed is:
1. A random access method, comprising:
   transmitting a random access request to a network device; and
   receiving a random access response, which is returned by the network device based on the random access request, wherein the random access response is used to indicate a value of an uplink Timing Advance (TA) adjustment amount, and the TA adjustment amount is a positive value, a negative value, or 0; wherein
   in a case that the random access response comprises a TA attribute indication field and an uplink Timing Advance Command (TAC) field, the TA attribute indication field is used to indicate a positive or negative attribute of the TA adjustment amount, and the TAC field has an indication field of a predetermined length for indicating an absolute value of the TA adjustment amount; wherein the indication field of the predetermined length is used to indicate a first mapping value of the TA adjustment amount; the first mapping value is used for indicating a terminal to obtain, based on the first mapping value and a predetermined first mapping table, the absolute value of the TA adjustment amount; and the predetermined first mapping table comprises a correspondence between the first mapping value and the absolute value of the TA adjustment amount;
   in a case that the random access response comprises a TAC field, the TAC field is used to indicate a second mapping value of the TA adjustment amount, wherein the second mapping value is used for indicating a terminal to obtain, based on the second mapping value and a predetermined second mapping table, the value of the TA adjustment amount, wherein the second mapping table comprises a correspondence between the second mapping value and the TA adjustment amount; or
   in a case that the random access response comprises a TAC field, the TAC field is used to indicate a second index value of the TA adjustment amount, wherein the second index value is used for indicating a terminal to obtain, based on the second index value and a predetermined TA adjustment amount algorithm, the value of the TA adjustment amount; wherein a length of the TAC field is N; the second index value, when being any of 0 to $2^{N-1}-2$, is used to indicate a TA adjustment value having a negative attribute; the second index value, when being $2^{N-1}-1$, is used to indicate a TA adjustment value having an attribute of 0; and the second index value, when being any of $2^{N-1}$ to $2^N-1$, is used to indicate a TA adjustment value having a positive attribute.

2. The random access method according to claim 1, wherein the TA attribute indication field is located outside the TAC field, and the predetermined length is equal to a length of the TAC field, or
   wherein the TA attribute indication field is located within the TAC field, the predetermined length is equal to a length of the TAC field minus 1, and the TA attribute indication field is located at a beginning or an end of the TAC field.

3. The random access method according to claim 1, wherein the random access request is transmitted by a terminal based on a TA estimation value; and the method further comprises:
   obtaining a target TA based on the TA estimation value and the TA adjustment amount.

4. A terminal, comprising:
   a memory having a computer program stored thereon; and
   a processor,
   wherein the processor is configured to, when executing the computer program, implement steps of the random access method according to claim 1.

5. A random access method, comprising:
   receiving a random access request transmitted by a terminal; and
   transmitting a random access response to the terminal based on the random access request, wherein the random access response is used to indicate a value of an uplink Timing Advance (TA) adjustment amount, and the TA adjustment amount is a positive value, a negative value, or 0; wherein
   in a case that the random access response comprises a TA attribute indication field and an uplink Timing Advance Command (TAC) field, the TA attribute indication field is used to indicate a positive or negative attribute of the TA adjustment amount, and the TAC field has an indication field of a predetermined length for indicating an absolute value of the TA adjustment amount; wherein the indication field of the predetermined length is used to indicate a first mapping value of the TA adjustment amount; the first mapping value is used for indicating a terminal to obtain, based on the first mapping value and a predetermined first mapping table, the absolute value of the TA adjustment amount; and the predetermined first mapping table comprises a correspondence between the first mapping value and the absolute value of the TA adjustment amount;

in a case that the random access response comprises a TAC field, the TAC field is used to indicate a second mapping value of the TA adjustment amount, wherein the second mapping value is used for indicating a terminal to obtain, based on the second mapping value and a predetermined second mapping table, the value of the TA adjustment amount, wherein the second mapping table comprises a correspondence between the second mapping value and the TA adjustment amount; or in a case that the random access response comprises a TAC field, the TAC field is used to indicate a second index value of the TA adjustment amount, wherein the second index value is used for indicating a terminal to obtain, based on the second index value and a predetermined TA adjustment amount algorithm, the value of the TA adjustment amount; wherein a length of the TAC field is N; the second index value, when being any of 0 to $2^{N-1}-2$, is used to indicate a TA adjustment value having a negative attribute; the second index value, when being $2^{N-1}-1$, is used to indicate a TA adjustment value having an attribute of 0; and the second index value, when being any of $2^{N-1}$ to $2^{N}-1$, is used to indicate a TA adjustment value having a positive attribute.

6. The random access method according to claim 5, wherein the TA attribute indication field is located outside the TAC field, and the predetermined length is equal to a length of the TAC field, or wherein the TA attribute indication field is located within the TAC field, the predetermined length is equal to a length of the TAC field minus 1, and the TA attribute indication field is located at a beginning or an end of the TAC field.

* * * * *